US008081326B2

(12) United States Patent
Okunishi et al.

(10) Patent No.: US 8,081,326 B2
(45) Date of Patent: Dec. 20, 2011

(54) COLOR IMAGING FORMING APPARATUS WITH IMAGE STABILIZATION CONTROL AND METHOD THEREFORE

(75) Inventors: Kazuo Okunishi, Okazaki (JP); Kohei Hayashi, Okazaki (JP); Tetsuya Sakai, Hoi-gun (JP); Hironori Akashi, Okazaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1084 days.

(21) Appl. No.: 11/979,272

(22) Filed: Oct. 31, 2007

(65) Prior Publication Data

US 2008/0130030 A1 Jun. 5, 2008

(30) Foreign Application Priority Data

Nov. 30, 2006 (JP) ................................ 2006-324563

(51) Int. Cl.
*G06F 3/12* (2006.01)
*G06K 1/00* (2006.01)
*H04N 1/60* (2006.01)
*G03G 15/00* (2006.01)

(52) U.S. Cl. ......... 358/1.13; 358/1.15; 358/1.9; 399/43; 399/8

(58) Field of Classification Search ........ 358/1.11–1.18, 358/1.9; 399/8, 24, 43, 82, 85
See application file for complete search history.

(56) References Cited

U.S. PATENT DOCUMENTS 5,422,705 A * 6/1995 Omelchenko et al. .......... 399/43
5,950,036 A * 9/1999 Konishi ............................ 399/8
6,280,105 B1 * 8/2001 Iida ................................ 400/74
6,788,907 B1 * 9/2004 Burkes et al. ................... 399/82
6,865,355 B2 * 3/2005 Burkes et al. ................... 399/85
6,960,036 B1 * 11/2005 Fujita et al. .............. 400/124.11
7,251,421 B2 * 7/2007 Yoshizuka et al. .............. 399/43
2006/0044334 A1 * 3/2006 Fujita et al. ...................... 347/12
2006/0083522 A1 * 4/2006 Frankel et al. .................. 399/24
2007/0165255 A1 * 7/2007 Takeuchi ........................ 358/1.9
2008/0192289 A1 * 8/2008 Honda et al. ................. 358/1.15
2009/0110414 A1 * 4/2009 Itoyama et al. ................. 399/27

FOREIGN PATENT DOCUMENTS

JP 2001-66842 A 3/2001
JP 2001-92196 A 4/2001
JP 2003-91224 A 3/2003
JP 2003-307901 10/2003
JP 2006-030422 2/2006

OTHER PUBLICATIONS

Notification of Reasons for Refusal in JP 2006-324563 dated Dec. 2, 2008, and an English Translation thereof.

* cited by examiner

*Primary Examiner* — James A Thompson
*Assistant Examiner* — Satwant Singh
(74) *Attorney, Agent, or Firm* — Buchanan Ingersoll & Rooney PC

(57) ABSTRACT

An image forming apparatus performs image stabilization after a printed page count exceeds a first threshold, if either an end of a job or a mode switch from monochrome mode to color mode has been detected. Even if neither the end of the job nor the mode switch from monochrome mode to color mode has been detected, the image forming apparatus performs image stabilization if the printed page count exceeds a second threshold that is larger than the first threshold.

12 Claims, 14 Drawing Sheets

FIG.9A

PRIORITY RANKING OF ACTIVATING FACTORS

| PRIORITY RANK | ACTIVATING FACTOR | TYPE OF STABILIZATION |
|---|---|---|
| 1 | TEMPERATURE OR HUMIDITY CHANGE | LONG STABILIZATION |
| 2 | PRINTED A PAGES OR MORE | SHORT STABILIZATION |
| 3 | PH UNIT TEMPERATURE CHANGE | REGISTRATION |

FIG.9B

IMAGE STABILIZATION SEQUENCES

| CONTROL NAME | LONG STABILIZATION | SHORT STABILIZATION | REGISTRATION |
|---|---|---|---|
| SEQUENCE 1 | IDC SENSOR LIGHT QUANTITY CORRECTION | SIMPLE REGISTRATION CORRECTION | SIMPLE REGISTRATION CORRECTION |
| SEQUENCE 2 | Dmax CORRECTION | SIMPLE TONE CORRECTION | |
| SEQUENCE 3 | LD LIGHT QUANTITY CORRECTION | | |
| SEQUENCE 4 | REGISTRATION CORRECTION | | |
| SEQUENCE 5 | TONE CORRECTION | | |

COLOR IMAGING FORMING APPARATUS WITH IMAGE STABILIZATION CONTROL AND METHOD THEREFORE

This application is based on application No. 2006-324563 filed in Japan, the content of which is hereby incorporated by reference.

BACKGROUND OF INVENTION

1. Field of the Invention

The present invention relates to a color image forming apparatus such as a printer or a Multi Function Peripheral (MFP), and in particular to the timing of an image stabilization operation.

2. Related Art

In a color image forming apparatus, optimum control variables for image formation are altered by changes in internal temperature and humidity and deterioration of parts such as photoreceptor drums and developer. For this reason, the image stabilization operation is performed under certain conditions to modify the control variables of apparatus parts in order to maintain a print image quality that is greater than or equal to a certain required reference image quality (required image quality).

Some issues that occur in this kind of image stabilization are that commodities (developer, etc.) are consumed, and a user is kept waiting during a downtime of the apparatus while the image stabilization operation is being performed. There is a conventional technology for optimizing conditions for performing image stabilization.

However, if a fixed condition is used as a condition for performing the image stabilization operation (e.g., when a printed sheet count reaches a certain sheet count), undesirable situations may occur, such as long downtime due to frequent premature image stabilization, or inferior printing continuing for a long duration due to late performance of image stabilization.

In the first place, image stabilization should be performed before the image quality falls below the required level. When determining the timing to perform image stabilization in a color image forming apparatus, particular consideration should be given to the fact that the required image quality is much more demanding in color printing than in monochrome printing.

The present invention has been achieved in view of the above issues, and an aim thereof is to provide a color image forming apparatus that can perform image stabilization at a timing appropriate for current conditions, taking into account the difference in required image quality between color and monochrome printing, user tolerance pertaining to downtime, etc.

SUMMARY OF INVENTION

In view of the above issues, a first aspect of the present invention is an image forming apparatus including a counter operable to count a number of printed pages to obtain a printed page count; a determiner operable to determine whether a next job is a monochrome print job or a color print job; an image stabilization controller operable to cause an image stabilization operation to be performed if a predetermined condition has been satisfied, the predetermined condition including any of (i) that an end of a current job is detected during a period that begins when the printed page count exceeds a first threshold and ends when the printed page count reaches a second threshold that is larger than the first threshold, (ii) that the determiner determines that a switch has been detected from the monochrome print job to the color print job during the period that begins when the printed page count exceeds the first threshold and ends when the printed page count reaches the second threshold, and (iii) that the printed page count exceeds the second threshold; and a resetter operable to reset the printed page count after the image stabilization operation has been performed.

According to this structure, the image stabilization controller causes image stabilization to be performed during the period that begins when the printed page count exceeds the first threshold and ends when the printed page count reaches a second threshold, if the next job is a color print job, thereby realizing a color-appropriate required image quality after stabilization. On the other hand, if a monochrome print job continues and if there is no switch to a color print job, this structure can prevent image stabilization being performed prematurely for monochrome printing by postponing the image stabilization operation until later.

Also, the image stabilization controller can cause the image stabilization to be performed at a timing that avoids downtime by detecting an end of a job during the period that begins when the printed page count exceeds the first threshold and ends when the printed page count reaches the second threshold.

Furthermore, even if no switch to a color print job has been detected, the controller causes image stabilization to be performed if the printed page count exceeds a second threshold that is larger than the first threshold, thereby enabling maintaining a required image quality in monochrome printing.

Another aspect of the present invention is an image stabilization control method for an image forming apparatus, including the steps of counting a number of printed pages to obtain a printed page count; determining whether a next job is a monochrome print job or a color print job; causing an image stabilization operation to be performed if a predetermined condition has been satisfied, the predetermined condition including any of (i) that an end of a current job is detected during a period that begins when the printed page count exceeds a first threshold and ends when the printed page count reaches a second threshold that is larger than the first threshold, (ii) that the determiner determines that a switch has been detected from the monochrome print job to the color print job during the period that begins when the printed page count exceeds the first threshold and ends when the printed page count reaches the second threshold, and (iii) that the printed page count exceeds the second threshold; and resetting the printed page count after the image stabilization operation has been performed.

BRIEF DESCRIPTION OF DRAWINGS

These and other objects, advantages, and features of the invention will become apparent from the following description thereof taken in conjunction with the accompanying drawings, which illustrate a specific embodiment of the present invention.

In the drawings:

FIG. 9A is a chart showing activating factors (flag ON factors) for image stabilization and a priority ranking, and FIG. 9B is a chart showing image stabilization sequences;

DETAILED DESCRIPTION OF PREFERRED EMBODIMENT

An MFP (Multi Function Peripheral) having functions such as scanning, copying, and printing is described below as an exemplary embodiment of an image forming apparatus of the present invention.

Structure

A structure of the MFP of the present embodiment is described below with reference to FIGS. 1 and 2.

Figure 1:
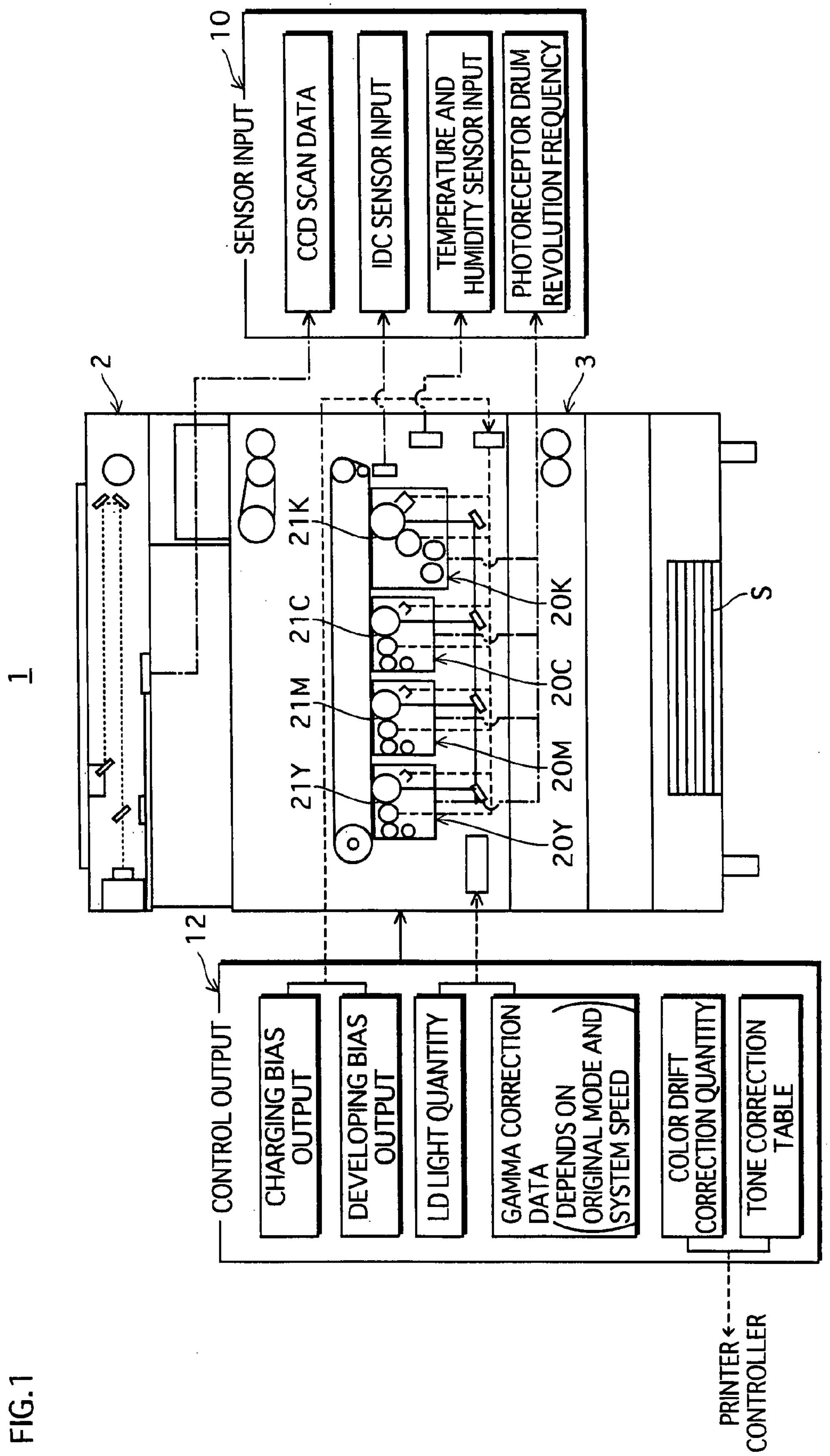
FIG. 1 shows a structure of a Multi Function Peripheral (MFP) and sensor inputs/outputs.

FIG. 1 shows a structure of a Multi Function Peripheral (MFP) and sensor inputs/outputs.

As shown in FIG. 1, a tandem-type MFP 1 includes a scanner part 2 and a printer 3, which performs printing (image forming) on a recording sheet S.

The printer 3 includes image forming units 20, 20M, 20C, and 20K for yellow (Y), magenta (M), cyan (C), and black (K), respectively.

The image forming units 20Y, 20M, 20C, and 20K have photoreceptor drums 21Y, 21M, 21C, and 21K respectively. In order to give the frequently-used black photoreceptor drum 21K a lifetime comparable to the color photoreceptor drums 21Y, 21M, and 21C, the size of the photoreceptor drum 21K has been made one size larger.

A sensor input 10 includes CCD scan data, IDC sensor (Image Density Sensor) input, temperature and humidity sensor input, and a photoreceptor drum revolution number.

Note that the IDC sensor is a reflective photosensor or the like, and detects an amount of toner adhering to a belt (corresponds to image density when transferred to the recording sheet) based on reflected light intensity from the belt.

A control output 12 includes a charging bias output used by an engine controller 30 (see FIG. 2), a developing bias output, an LD light quantity, gamma correction data, a color drift correction quantity used by a printer controller 40, and a tone correction table. The control output 12 is used as a control variable when performing image stabilization operation.

Figure 2:
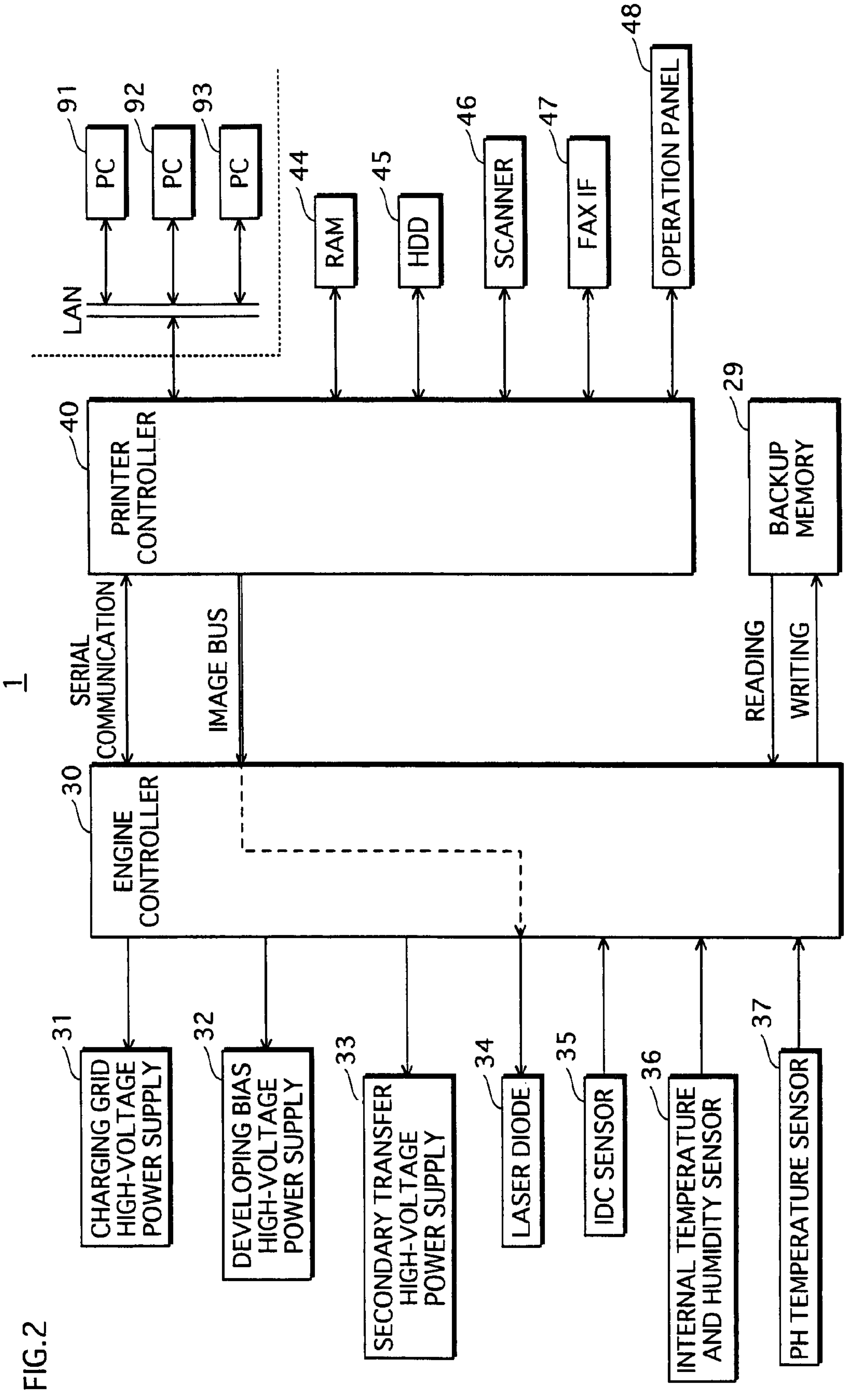
FIG. 2 is a functional block diagram of the MFP.

FIG. 2 is a functional block diagram of the MFP.

As shown in FIG. 2, the MFP 1 includes the engine controller 30 and the printer controller 40.

The engine controller 30 controls the mechanisms for printing such as a charging grid high-voltage power supply 31, a developing bias high-voltage power supply 32, a secondary transfer high-voltage power supply 33, and a laser diode 34, in accordance with sensor input values from an IDC sensor 35, an internal temperature and humidity sensor 36, and a print head (hereinafter abbreviated as PH) temperature sensor 37 (sensor input 10 [see FIG. 1]). Also, the engine controller 30 scans/writes various types of data (printed page count, etc.) from/to a backup memory (ROM) 29.

The printer controller 40 controls a RAM 44, an HDD 45, a scanner 46, a FAX IF 47, and an operation panel 48. Also, the printer controller 40 can perform serial negotiation with the engine controller 30, and exchanges data with PCs 91 to 93 via a LAN as well as providing image data to the engine controller 30 via an image bus.

The RAM 44 and the HDD 45 are storage media. The RAM 44 is superior in terms of transfer speed, and the HDD 45, while inferior to the RAM 44 in terms of transfer speed, tends to have an advantage in terms of storage capacity.

The scanner 46 includes the scanner part 2 as hardware. The scanner 46 scans an original and creates image data.

The fax IF 47 performs fax transmission/reception of image data.

The operation panel 48 includes a touch panel and push-button keys as hardware. The operation panel 48 receives an input operation from a user as well as performing various displays for the user.

Operations

Figure 3:
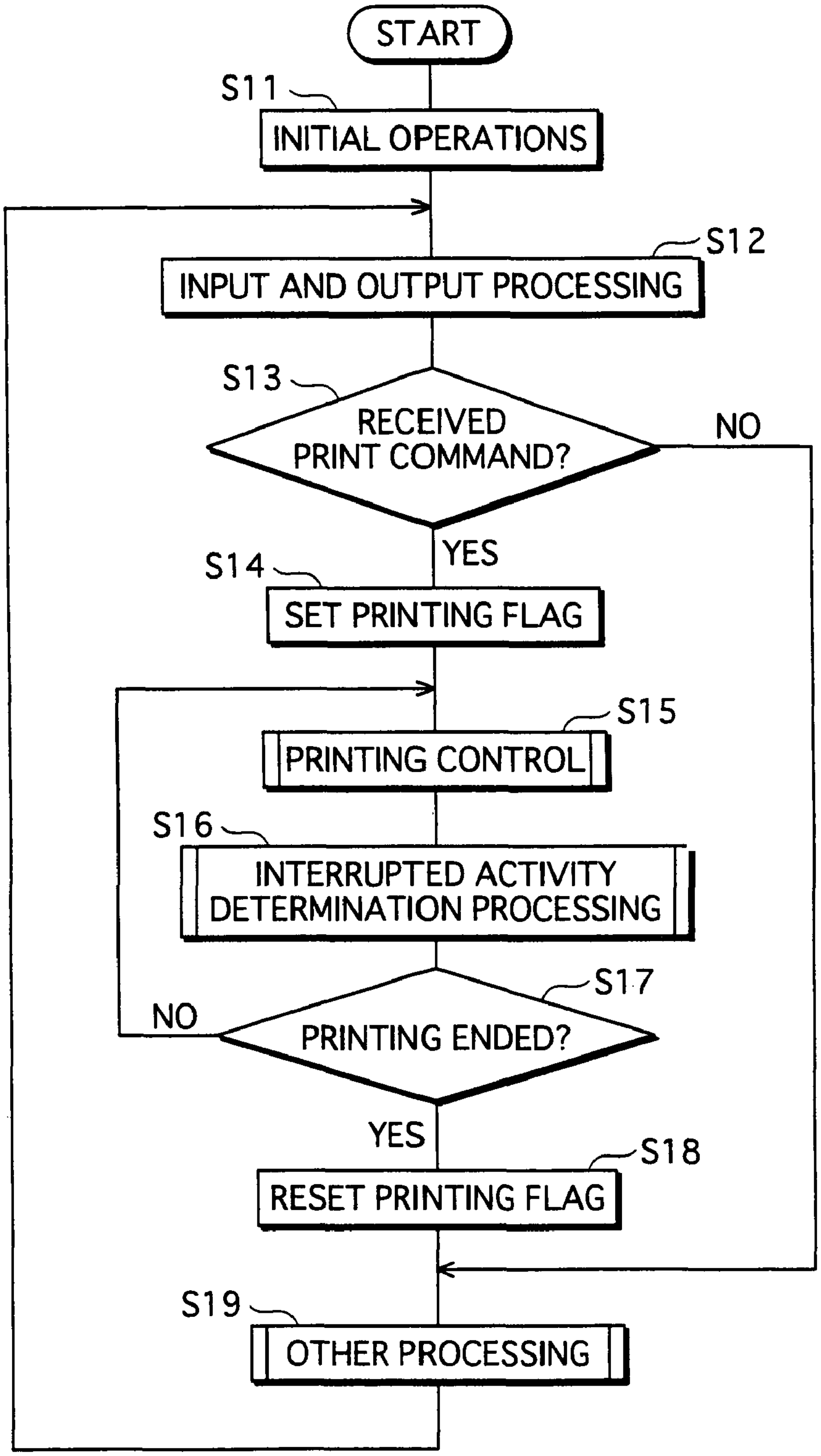
FIG. 3 is a flowchart showing operations that are performed by an engine controller 30.

FIG. 3 is a flowchart showing operations that are performed by an engine controller 30.

The engine controller 30 performs initial operations (S11) and input and output processing (S12), and upon reception of a print command (S13: YES), sets a printing flag (S14) and performs printing control (S15) with respect to the recording sheet S.

In printing control (S15), the engine controller 30 prints a toner pattern to a transfer belt unit in correspondence with image data received from the printer controller 40, detects the toner pattern on the belt with use of the IDC sensor, and controls optimal charging output, developing output, and laser light quantity based on a result of the detection. Also, the engine controller 30 detects a color drift amount and tone data depending on the type of control, and transmits a result thereof to the printer controller 40 as a print report.

Next, the engine controller 30 performs an interrupted activity determination processing subroutine (S16) that is described later, and if printing has ended (S17:YES), resets the printing flag (S18), and performs other processing (S19).

Note that the other processing includes controlling fixing parts and temperature, detecting a paper cassette size, scanning the temperature and humidity sensor information that is necessary for an image stabilization decision, controlling a nonvolatile memory, etc.

Figure 4:
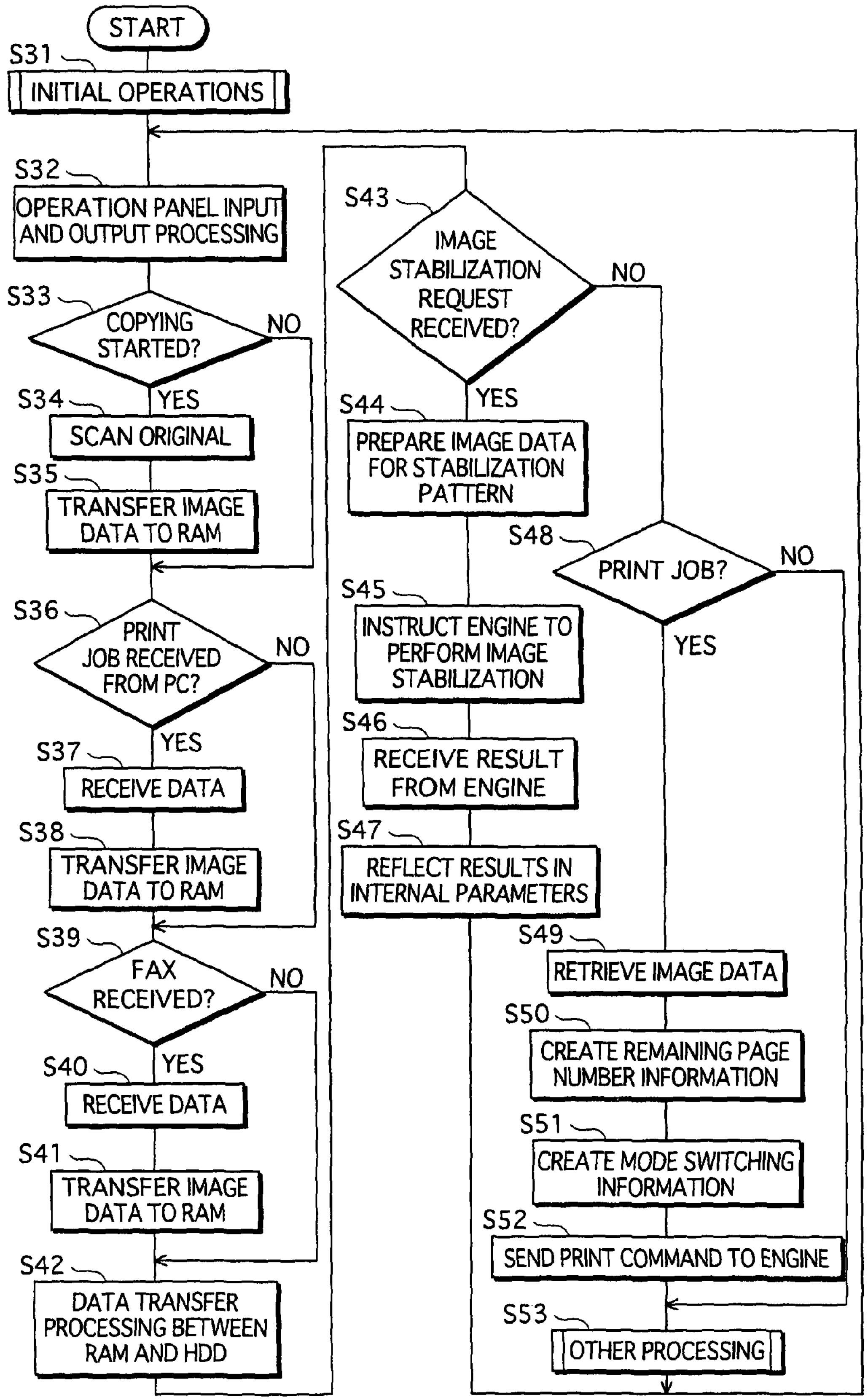
FIG. 4 is a flowchart showing operations that are performed by a printer controller 40.

FIG. 4 is a flowchart showing operations that are performed by a printer controller 40.

After performing various initial operations (S31) and operation panel input and output processing (S32), the printer controller 40 performs any of three types of image data processing, namely copying (S33 to S35), PC printing (S36 to S38), and fax reception (S37 to S39).

In a case of copying, when copying has started (S33:YES), image data is generated by scanning an original (S34) and then is transferred to the RAM (S35).

In a case of PC printing, the printer controller 40 receives a printer command created by a PC printer driver via a LAN, receives the image data to be printed (S36:YES, S37), and transfers the image data to the RAM (S38).

In a case of fax reception, upon receiving image data via a telephone line or the like (S40), the printer controller 40 transfers the image data to the RAM (S41).

Data transfer processing (S42) is performed between the RAM and the HDD in view of the data size of the relevant image data and the advantages and disadvantages of the transfer speed.

Figure 10:
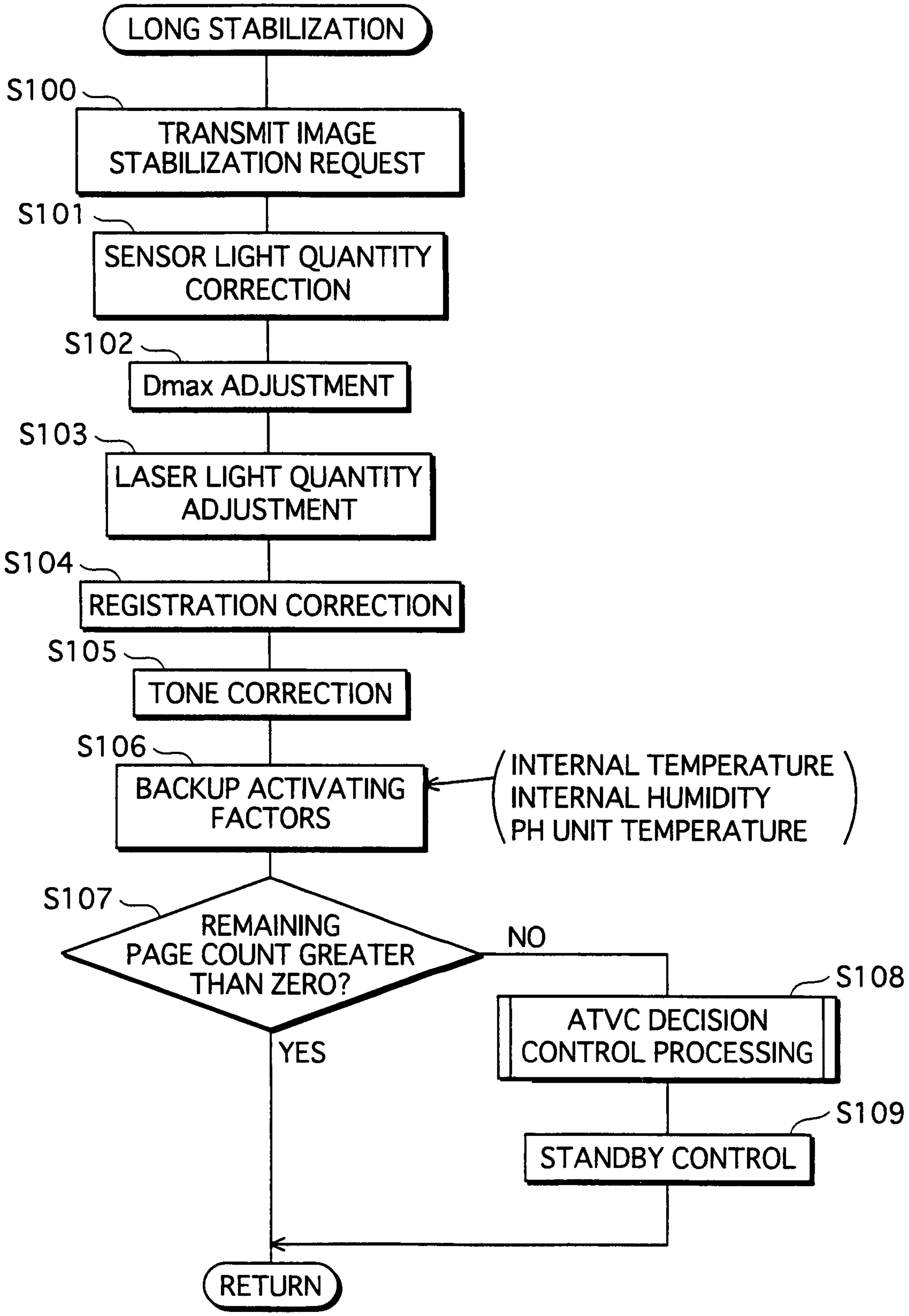
FIG. 10 is a flowchart showing long stabilization processing performed by the engine controller 30.

Upon receiving an image stabilization request (S100 of FIG. 10; S120 of FIG. 11; S130 of FIG. 12) from the engine controller 30 (S43:YES), the printer controller 40 prepares image data for an image stabilization pattern (S44), instructs an engine to perform image stabilization (S45), receives a result from the engine (S46), and changes internal parameters in accordance with the result (S47).

If a print job exists (S48), the printer controller 40 retrieves image data (S49), creates remaining page count information (S50), creates mode switching information (S51), and transmits a print command including the above information to the engine controller 30 (S52). Then the printer controller 40 performs other processing (S53) and returns to step S32.

Figure 5:
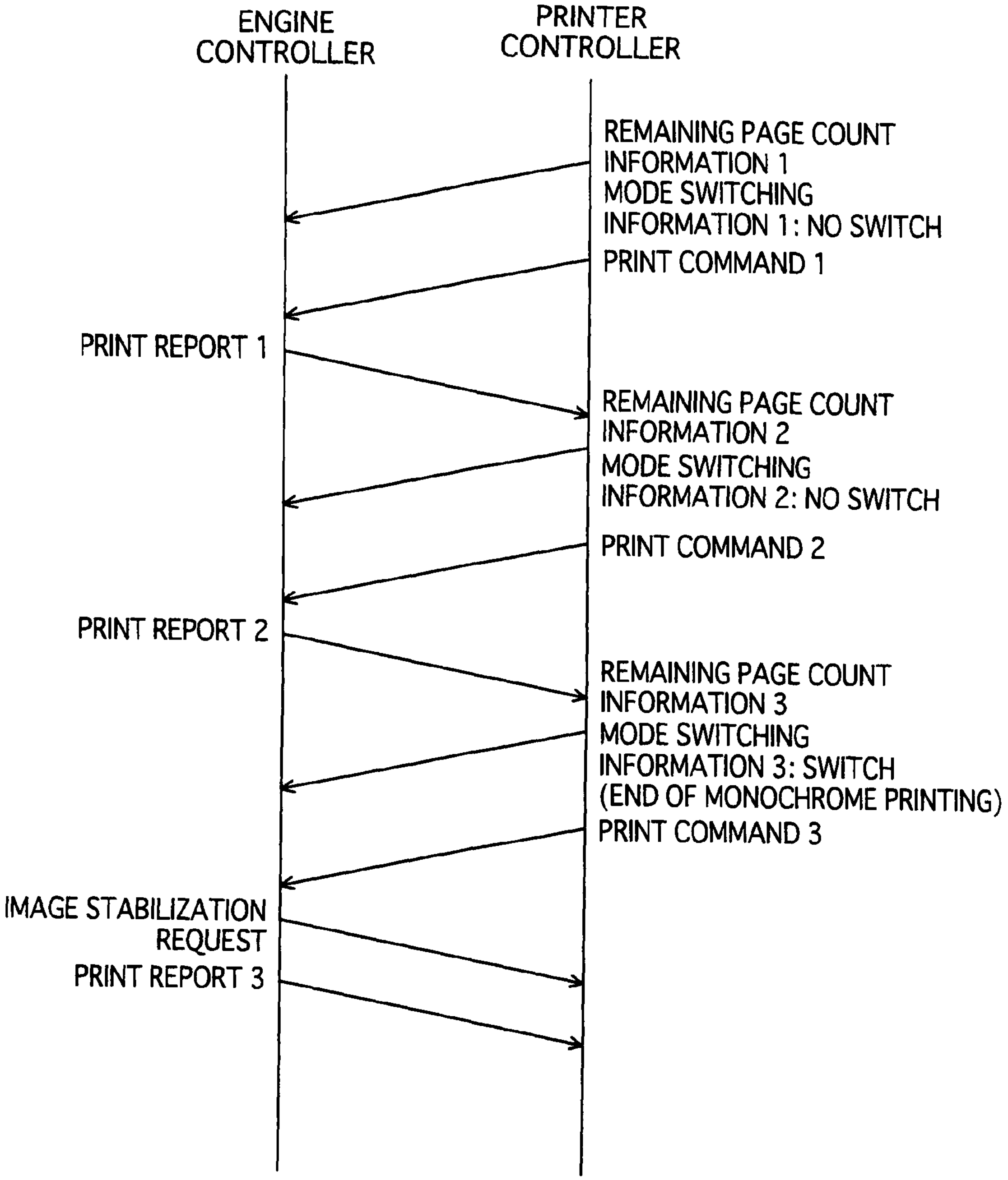
FIG. 5 shows a sequence of operations performed between the engine controller 30 and the printer controller 40, regarding printing and an image stabilization request.

FIG. 5 shows a sequence of operations performed between the engine controller 30 and the printer controller 40, regarding printing and an image stabilization request.

The printer controller 40 sends (1) the remaining page count information, (2) the mode switching information, and (3) the print command to the engine controller 30 for each page to be printed. In response, the engine controller 30 sends the print report to the printer controller 40. Note that the printer controller 40 also responds to print commands (not depicted) pertaining to various types of mode information (paper feed slot, color/monochrome mode, one-sided or two-sided print mode).

The printed page count here refers to a number of pages of image formation, and if images are printed on both sides of one sheet, the printed page count is two.

The remaining page count information and the mode switching information are sent to the engine controller 30 in advance of the print command, and the engine controller 30 starts print operations upon receiving the print command. The engine controller 30 sends a print start report to the print controller 40 upon starting print operations, and simultaneously updates a printed page count counter value.

If the printed page count is greater than or equal to a predetermined value, the engine controller 30 decides whether a job has ended, by referencing the remaining page count information and the mode switch information sent from the print controller 40, and notifies an image stabilization request to the printer controller 40.

Note that FIG. 5 shows exchanges of information between the engine controller 30 and the printer controller 40 when the printed page count is greater than or equal to a predetermined value, and upon receiving the mode switching information 3 that indicates a switch (end of monochrome printing), the engine controller 30 decides that the job has ended, and transmits an image stabilization request to the printer controller 40.

Here, the mode switching information 3 (end of monochrome printing) indicates that a print command 3 pertains to a last monochrome printing before a switch to color printing.

Although not depicted in FIG. 5 note that the printer controller 40, upon receiving a print report 3 from the engine controller 30, instructs the engine controller 30 to start image stabilization, and the engine controller 30 starts to prepare for image stabilization after a predetermined operation has been performed in print processing.

Figure 6:
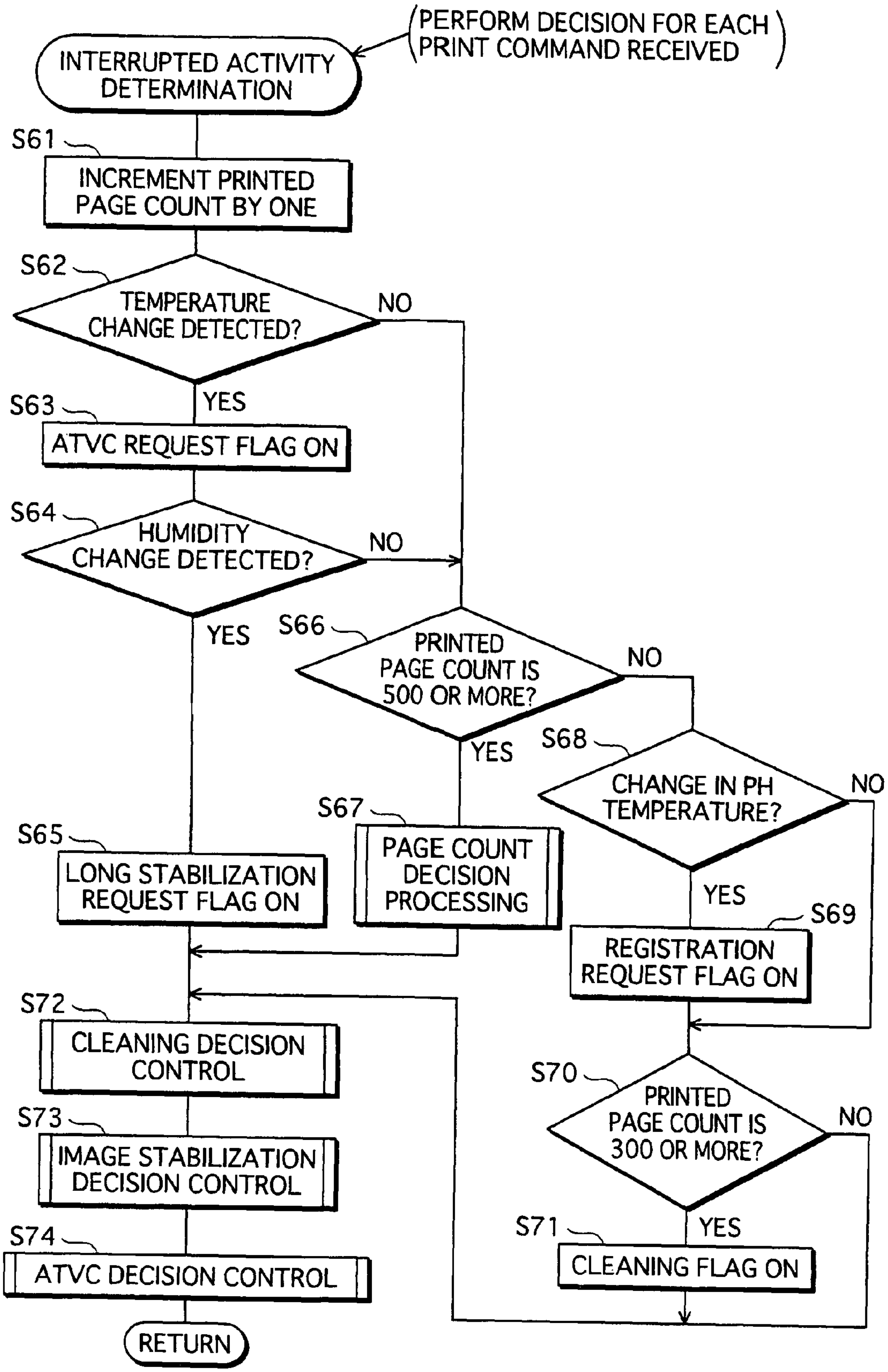
FIG. 6 is a flowchart showing processing of an interrupted activity determination.

FIG. 6 is a flowchart showing processing of an interrupted activity determination.

Upon finishing printing control (S15), the engine controller 30 increments the printed page count by one (S61).

If a change in temperature is detected when comparing the internal temperature at the time of the previous image stabilization operation and the temperature at the time of the decision (S62:YES), an ATVC request flag is set to ON (S63). Similarly, if a humidity change is detected (S64:YES) compared to the internal humidity at the time of the previous image stabilization operation, a long stabilization request flag is set to ON (S65).

If the temperature and humidity have not changed, and the printed page count is 500 or more (S66:YES), the image forming apparatus performs a page count decision subroutine (S67). If the number of pages is less than 500 (S66:NO), the image forming apparatus performs a PH temperature change decision (S68). The PH temperature change decision is performed by comparing the temperature in a PH unit at the time of the previous image stabilization to the temperature at the time of the decision.

If the PH temperature has changed (S68:YES), the registration request flag is set to ON (S69). Regardless of whether the PH temperature has changed, if the number of pages printed is 300 or more (S70:YES), a cleaning flag is set to ON (S71). Note that the printed page count in step S70 (300 pages) is set to be smaller than the printed page count in step S66 (500 pages).

Figure 7:
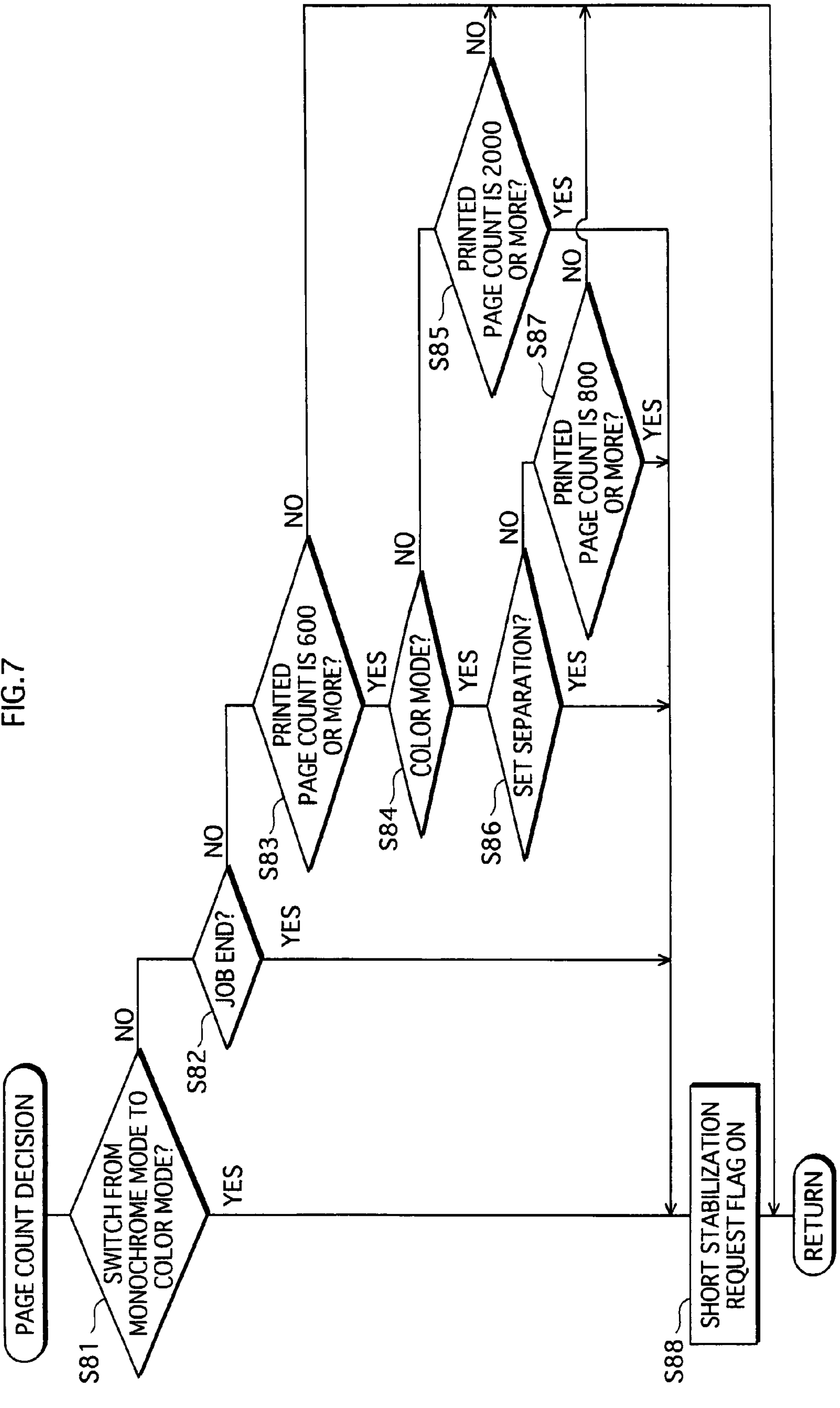
FIG. 7 is a flowchart showing processing pertaining to a page count decision.

FIG. 7 is a flowchart showing processing pertaining to a page count decision.

If there is a switch from monochrome mode (a mode in which only monochrome printing is permitted) to color mode (a mode in which both monochrome printing and color printing are permitted) (S81:YES), or if the end of the image formation job is detected (S82:YES), a short stabilization request flag is set to ON (S88).

Also, the job end decision can be made based on, for example, the remaining page count information indicating zero. When the job has ended, a risk of apparatus downtime due to image stabilization is small. Also, performing the image stabilization enables preparing for a next instance of color printing.

If there has not been a mode switch and the job has not ended (S81:NO, S82:NO), the image forming apparatus performs the page count decision (S83). If the printed page count is 600 or more (S83:YES), the image forming apparatus is in color mode (S84:YES), and a separation between sets is detected (S86:YES), the short stabilization request flag is set to ON (S88).

This is in accordance with a value decision that it is desirable to avoid performing image stabilization during a print set, which would result in different image qualities between pages of the same set.

Even if a separation between sets has not been detected (S86:NO), the short stabilization flag is set to ON (S88) if the number of pages printed is 800 pages or more (S87:YES). This is because image stabilization should be performed after 800 pages, since the required image quality is higher in the color mode than in the monochrome mode.

Even in the monochrome mode (S84:NO) the short stabilization request flag is set to ON (S88) if the printed page count reaches 2000 (S85:YES).

In terms of tone reproducibility for example, a tone discrepancy is less noticeable in monochrome than in color printing, but when a plurality of colors are superimposed, a discrepancy that would not be noticeable in monochrome readily becomes significant. Also, color drift is a problem unique to color printing, and is not a problem in monochrome printing.

In the monochrome mode, the conditions of which differ greatly from color mode, the timing of image stabilization can be delayed to a certain extent without readily causing a problem. Therefore, in the present embodiment, the threshold for monochrome mode is set at 2000 pages, which is a considerably high value.

Figure 8:
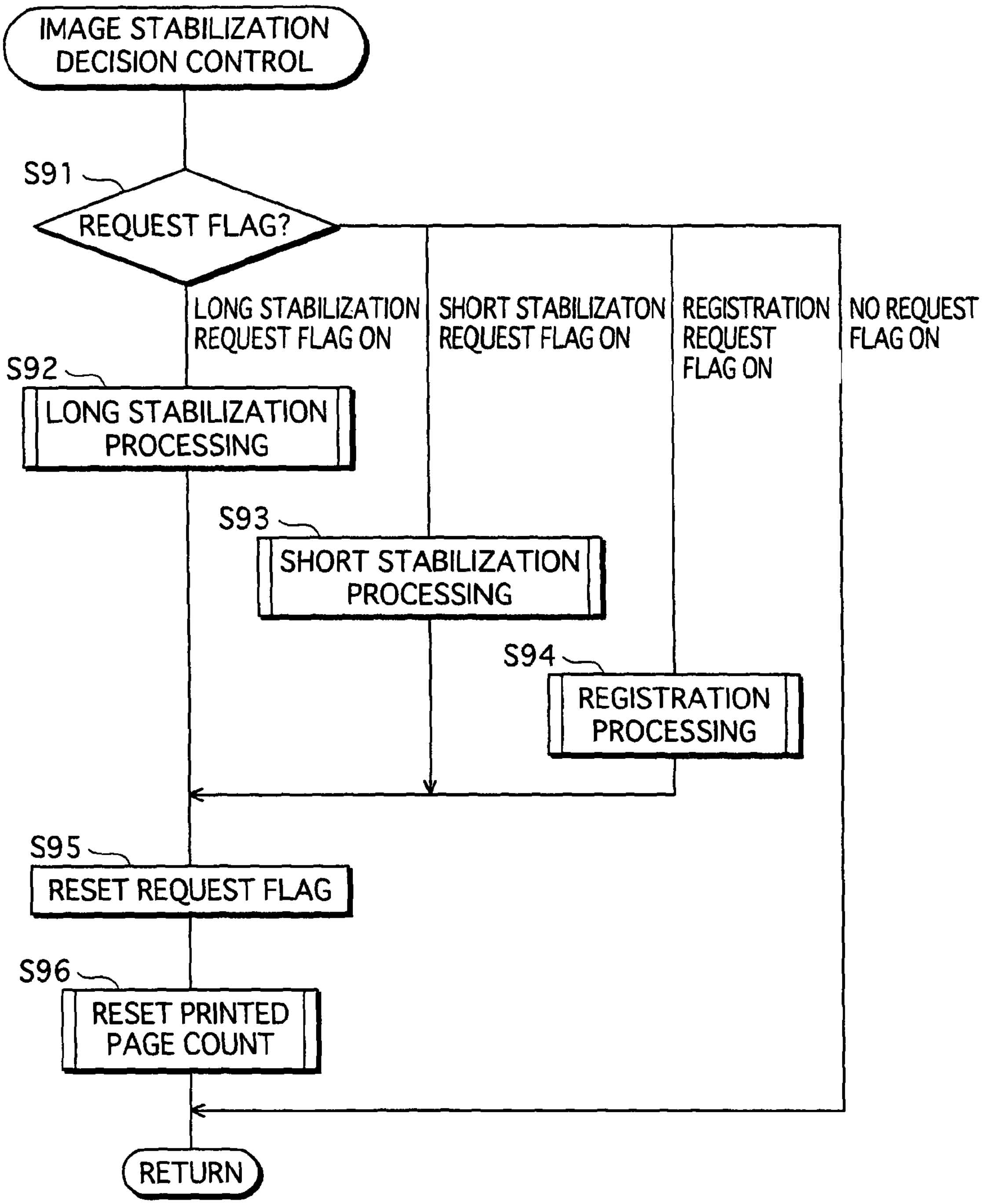
FIG. 8 is a flowchart showing processing by which the engine controller 30 controls an image stabilization decision.

FIG. 8 is a flowchart showing processing by which the engine controller 30 controls an image stabilization decision.

First, the engine controller 30 performs a decision regarding request flags (S91).

If the long stabilization request flag is ON, processing moves to the long stabilization (S92) subroutine. If the short stabilization request flag is ON, processing moves to the short stabilization (S93) subroutine. If the registration request flag is ON, the image forming apparatus performs the registration request (S94) subroutine. Thereafter, the request flags are reset (S95), and the printed page count is reset (S96).

Note that if two or more request flags are ON, the image forming apparatus follows the following priority ranking shown in FIG. 9A, from highest to lowest: long stabilization, short stabilization, and registration implementation.

FIG. 9A is a chart showing activating factors (flag ON factors) for image stabilization and a priority ranking, and FIG. 9B is a chart showing image stabilization sequences.

As shown in FIG. 9A, a temperature or humidity change is the highest-priority activating factor. This is because the image forming process conditions are greatly influenced by internal environmental conditions.

The second highest-priority activating factor is printing A pages or more, where A is a predetermined page count (500 pages in the example shown in FIG. 6). Simple tone correction is performed, since subtle tone changes occur due to changes in sensitivity of the photoreceptors after printing a predetermined number of pages.

Since temporal image forming processing conditions are looser than changes in environmental variables, simple tone correction does not need to be performed as precisely as during normal control, and since interruption time during printing is reduced to a minimum, a detection pattern of simple tone correction has fewer tone settings than normal tone correction.

The lowest-priority activating factor is a change in temperature in the PH unit. Simple registration correction is performed to correct simple registration dislocations that have occurred due to LED warpage or the like caused by a temperature change in the PH unit during printing.

In this way, the priority ranking of activating factors has been set in accordance with the order of influence they have on the image.

Note that the control sequences activated by each activating factor include any control sequences that are activated by a lower priority factor.

Figure 11:
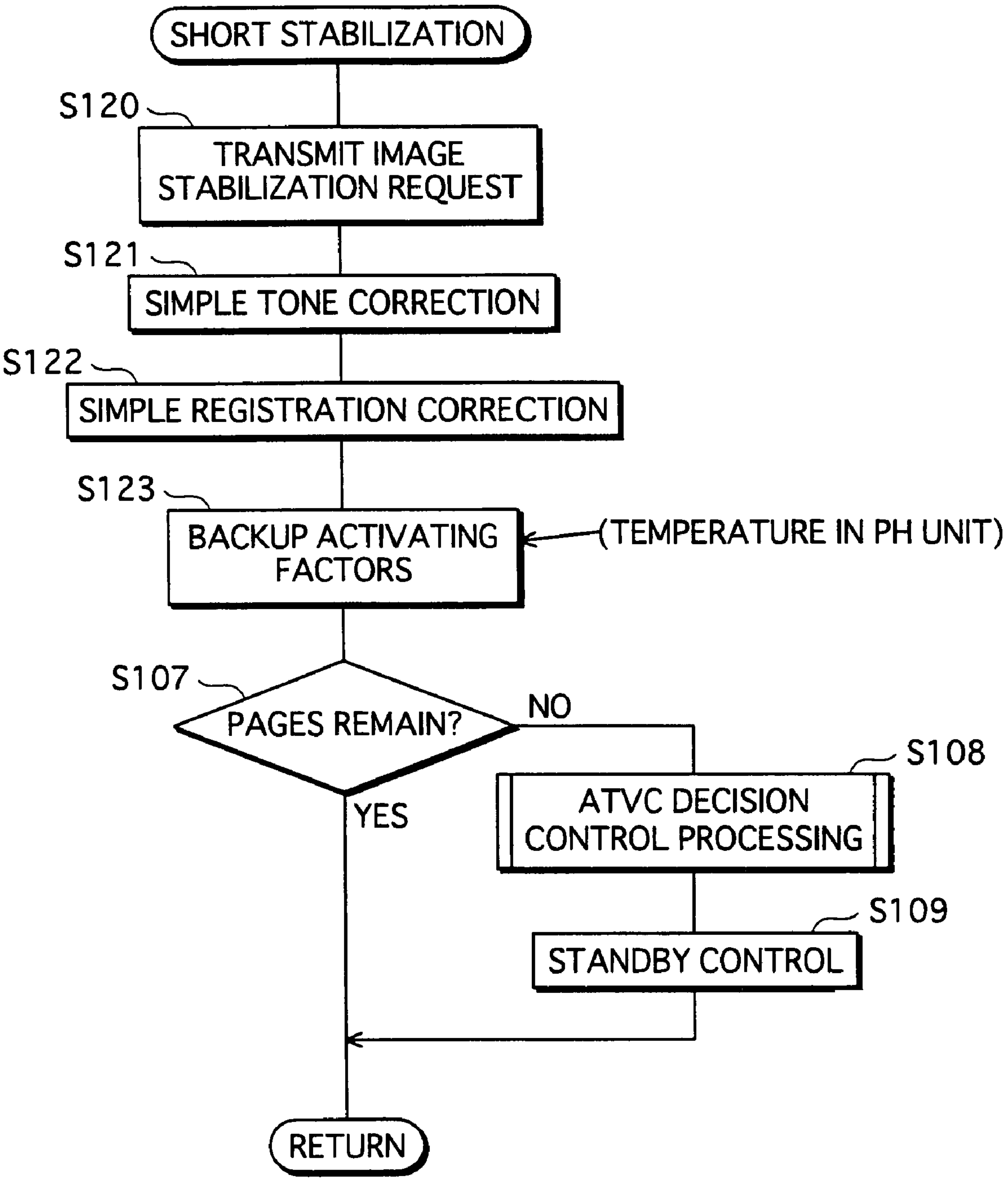
FIG. 11 is a flowchart showing short stabilization processing performed by the engine controller 30.
Figure 12:
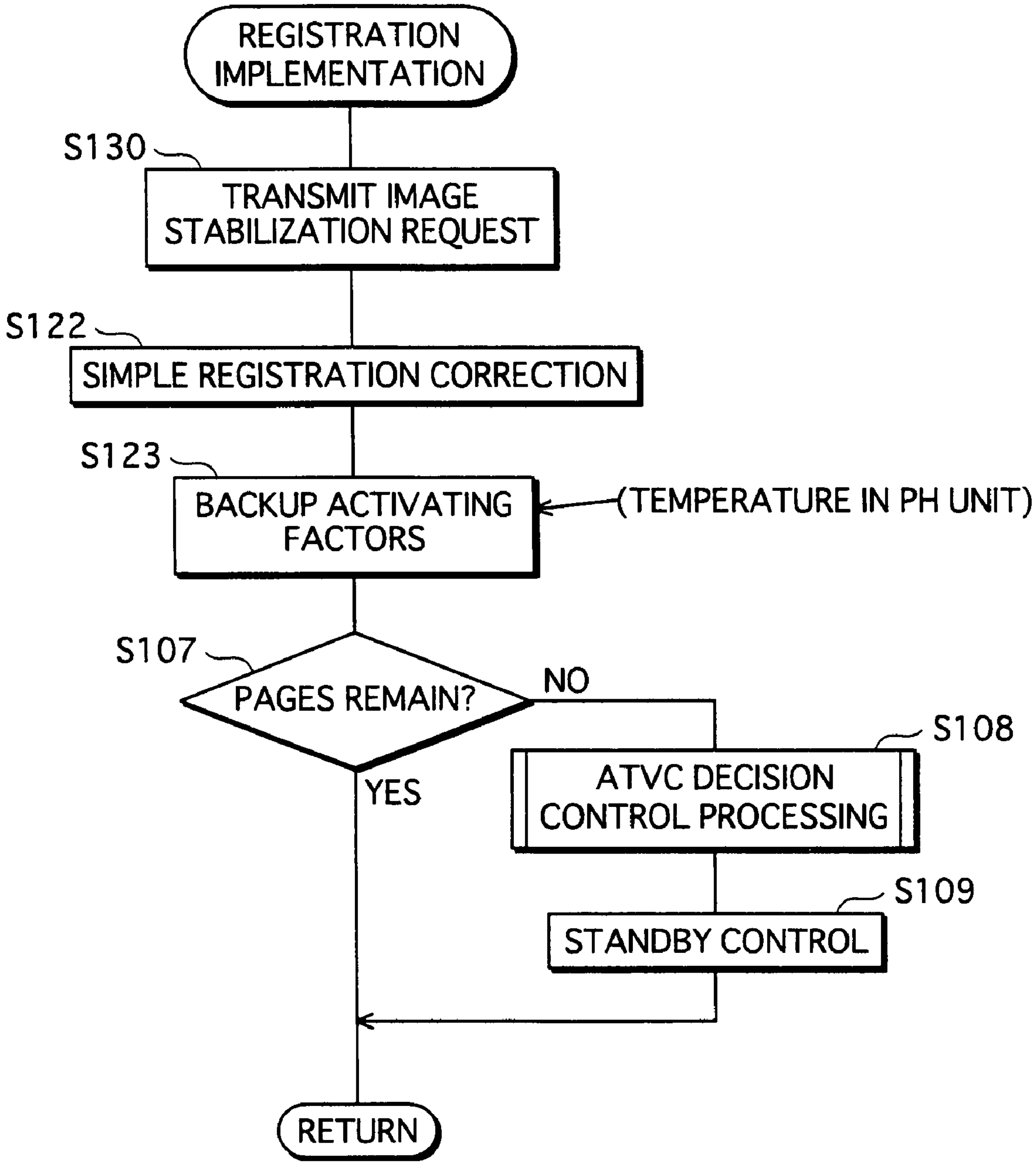
FIG. 12 is a flowchart showing registration processing performed by the engine controller 30.

Following is a description of subroutines pertaining to three types of image stabilization. In the flowcharts of FIGS. 10 to 12, the same processing has been given the same step numbers, and description thereof has been shortened.

(1) FIG. 10 is a flowchart showing long stabilization processing performed by the engine controller 30.

First, the engine controller 30 transmits an image stabilization request to the printer controller 40, and obtains stabilization pattern image data necessary for the long stabilization operation (S100, in FIG. 4 S43 to S45).

Next, the engine controller 30 performs sensor light quantity correction (S101) for adjusting reflected light intensity measured by the IDC sensor of a belt surface not having toner (a bare surface) to a predetermined value, and then reproduces gradient tones by causing changes in the "light quantity" of the laser diode (LD), which is the exposure source at the time of image formation, and "dot density", and performs a Dmax (maximum absolute density) adjustment step (S102), which is a step for determining a maximum density as a reference.

Then, the LD light quantity is adjusted, as well as the intensity per dot. The engine controller 30 performs laser light quantity adjustment (S103) for adjusting the LD light quantity in accordance with an average amount of intensity detected in image data that has a certain dot ratio, and performs registration correction (S104) for detecting and correcting a main scanning detection pattern and a vertical scanning detection pattern printed on each belt, and an amount of position shift of the colors (Y, M, C, and K) is detected and corrected based on the pattern image scan by the IDC sensor.

Thereafter, the engine controller 30 performs tone correction (S105) and backup of activating factors such as internal temperature and PH unit temperature (S106).

Note that during tone correction, the image forming apparatus prints a predetermined gradation image on the belt, corrects a tone correction table (γ table), and scans the density of the printed gradation image with use of the ID sensor. The tone correction table shows the relationship between the input image data and the output LD light quantity and dot density, when the LD light quantity and the dot density (ON/OFF ratio) is selected in correspondence with the density of the image data to be printed (for example, an image data density expressed between 0 and 255), and printing is performed.

If the remaining page count is greater than zero (S107: YES), the engine controller 30 ends the subroutine and proceeds to S95. If the remaining page count is not greater than zero (S107:NO), the ATVC decision control subroutine is performed (S108).

(2) FIG. 11 is a flowchart showing short stabilization processing performed by the engine controller 30.

First, the engine controller 30 transmits an image stabilization request to the printer controller 40, and obtains image data for a stabilization pattern necessary for short stabilization operations (S120, FIG. 4, S43 to S45).

Next, simple tone correction (S121), simple registration correction (S122), and backup of activating factors such as PH unit internal temperature (S123) are performed.

Here, assuming that simple tone correction and simple registration correction are performed during printing, making the detection pattern printed on the belt shorter in a vertical scanning direction and the number of detection patterns fewer than in the normal tone correction and registration correction above reduces losses (time and commodity losses) due to image stabilization operation.

FIG. 12 is a flowchart showing registration processing performed by the engine controller 30.

First, the engine controller 30 transmits an image stabilization request to the printer controller 40, and obtains image data for a stabilization pattern necessary for registration operation (S130, FIG. 4, S43 to S45), and performs simple registration correction (S122).

Following is a description of cleaning decision control and then ATVC decision control.

Figure 13:
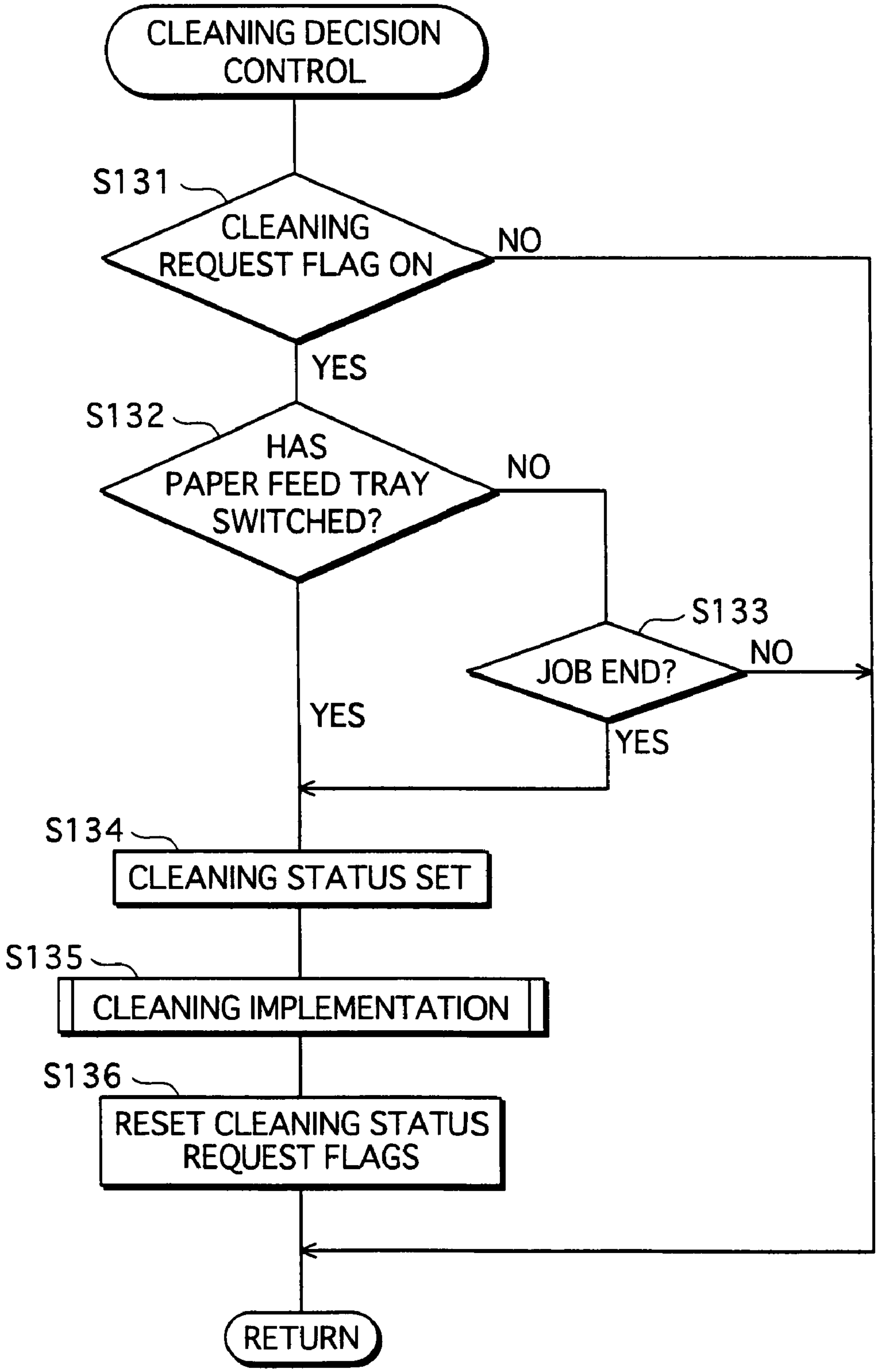
FIG. 13 is a flowchart showing control of a cleaning decision.

FIG. 13 is a flowchart showing control of a cleaning decision.

The cleaning decision is a subroutine corresponding to step S72 in FIG. 6.

If the cleaning request flag is ON (S131:YES) and a paper feed tray has been switched (S132:YES), the engine controller 30 decides that the paper size has switched during paper feeding, sets the status to a currently cleaning status (S134), and implements cleaning to remove toner attached to nonpaperfeeding portion of the secondary transfer roller (S135). If the paper feed tray has not been switched (S132:NO), the image forming apparatus does not set the status to the currently cleaning status, since no particular problems will occur if the next paper is the same size.

Also, when the job end is detected (S133:YES), the image forming apparatus implements cleaning in preparation for the next print job (S134, S135).

Note that operations pertaining to setting the status in steps S134 and S136 involve storing cleaning control status information before beginning cleaning, and clearing such information after cleaning finishes in order to prevent erroneously judging an interruption in the job due to the cleaning or the like to be the job end.

Figure 14:
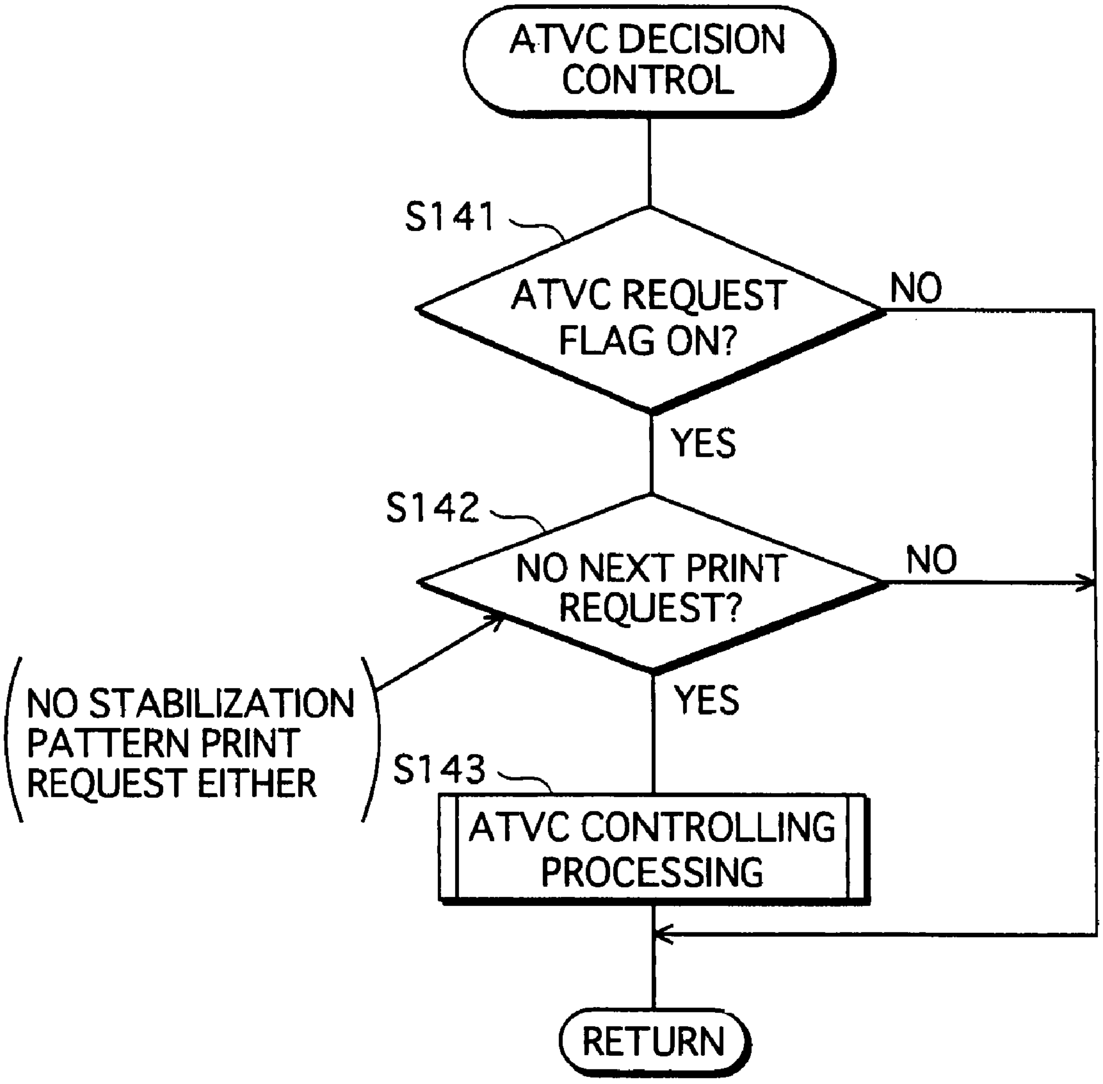
FIG. 14 is a flowchart showing control of an ATVC decision.

FIG. 14 is a flowchart showing control of an ATVC decision.

ATVC control involves adjusting voltage and current applied in the transfer process by measuring resistance values of the transfer belt and transfer rollers.

The ATVC decision is a subroutine corresponding to step S74 in FIG. 6 and step S108 in FIGS. 10 to 12.

First, if the ATVC request flag is ON (S141:YES), and another print request does not exist (S142:YES), ATVC controlling is performed (S143). The decision in step S142 can be, for example, performed based on the remaining page count information, similarly to the decision in step S107.

According to the present embodiment described above, if the number of pages printed reaches or exceeds 500 pages, image stabilization is performed when switching to color mode that demands high quality, thereby enabling maintaining a quality of color printing that is greater than or equal to a certain required reference.

Also, if monochrome mode continues, that is, if no switch to color mode or detection of the job end occurs, image stabilization is delayed until the printed page count reaches 2000, thereby preventing a loss of productivity due to downtime when performing image stabilization that is scarcely needed, and also preventing wasteful consumption of developer and power.

Supplementary Remark 1

1. Although not described in detail in the embodiment, 500 pages is a threshold at which stabilization should be performed in color mode, 800 pages is a threshold at which stabilization must be performed in color mode, and 2000 pages is a threshold at which stabilization must be performed in monochrome mode.

2. Although in the embodiment, one page that has been printed is merely recorded as one page of the printed page count, the printed page count may be weighted differently depending on, for example, paper size or color/monochrome mode.

3. Although in the embodiment, as shown in FIG. 5, mode switch information is transmitted to the engine controller when there is a mode switch, information indicating, for example, how many pages remain until the end of a monochrome print job may be transmitted or received instead.

This enables anticipation of the mode switch before detecting the final page of an image formation job, thus enabling earlier preparation for image stabilization and the like.

4. The image forming apparatus of the present invention is applicable as an image stabilization control method, and furthermore as a program for causing a computer to realize the method. The program can be stored on various computer-readable recording media including, for example, a magnetic disk such as a magnetic tape and a flexible disk, an optical recording medium such as a DVD, CD-ROM, CD-R, MO, or PD, and a flash memory such as Smart Media (registered trademark). The program can be produced or transferred in the form of the recording medium, and can also be transmitted and supplied in the form of a program via various wired or wireless networks including the Internet, broadcasting, telecommunication lines or satellite communications.

Also, the above program need not include every module for causing a computer to execute the processing described above. For example, a computer may be caused to execute all of the processing of the present invention with use of various general-purpose programs that can be installed on another information processing apparatus, such as a program included in a communication program or an operation system (OS). Accordingly, all of the above modules need not necessarily be recorded on the recording medium, and all of the modules do not necessarily need to be transmitted. Furthermore, there are also cases in which predetermined processing is executed with use of dedicated hardware.

Supplementary Remark 2

(1) One aspect of the present invention is an image forming apparatus including a counter operable to count a number of printed pages to obtain a printed page count; a determiner operable to determine whether a next job is a monochrome print job or a color print job; an image stabilization controller operable to cause an image stabilization operation to be performed if a predetermined condition has been satisfied, the predetermined condition including any of (i) that an end of a current job is detected during a period that begins when the printed page count exceeds a first threshold and ends when the printed page count reaches a second threshold that is larger than the first threshold, (ii) that the determiner determines that a switch has been detected from the monochrome print job to the color print job during the period that begins when the printed page count exceeds the first threshold and ends when the printed page count reaches the second threshold, and (iii) that the printed page count exceeds the second threshold; and a resetter operable to reset the printed page count after the image stabilization operation has been performed.

(2) In the structure of (1), the current job may include a plurality of print sets, and the predetermined condition may further include that a separation between sets is detected in the job during the period that begins when the printed page count exceeds the first threshold and ends when the printed page count reaches the second threshold, even if the end of the current job has not been detected. There is a difference in image quality before and after image stabilization. Accordingly, this structure prevents the user from feeling a sense of discord when the image quality differs between pages in a set, for example midway through a booklet.

(3) In the structure of (2), the predetermined condition may further include that the separation between sets is detected after the printed page count has reached a third threshold that is larger than the first threshold and smaller than the second threshold. According to this structure, using the third threshold enables a timing of performing image stabilization to be set more precisely.

(4) In the structure of (1), the determiner may determine that the switch has been detected in accordance with information indicating an end of monochrome printing.

(5) In the structure of (1), the determiner may determine that the switch has been detected in accordance with information indicating a remaining page count in the monochrome print job.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus comprising:

a counter for counting a number of pages that have been printed since a last reset of the counter;

a determiner for determining whether a next job is in a monochrome print mode or in a color print mode;

an image stabilizer to perform an image stabilization operation;

a resetter for resetting the printed page count after the image stabilization operation has been performed;

an image stabilization controller to cause the image stabilization operation to be performed if a predetermined condition has been satisfied, the predetermined condition including any of:

(i) that an end of a current job is detected during a period that begins when the printed page count exceeds a first threshold and ends when the printed page count reaches a second-threshold that is larger than the first threshold, and (ii) that the determiner determines that a switch has been detected from the monochrome print mode to the color print mode during the period that begins when the printed page-count exceeds the first threshold and ends when the printed page count reaches the second threshold.

2. The image forming apparatus of claim 1, wherein the current job includes a plurality of print sets;

the predetermined condition further includes that a separation between sets is detected in the job during the period that begins when the printed page count exceeds the first threshold and ends when the printed page count reaches the second threshold, even if the end of the current job has not been detected.

3. The image forming apparatus of claim 2, wherein the predetermined condition further includes that the separation between sets is detected after the printed page count has reached a third threshold that is larger than the first threshold and smaller than the second threshold.

4. The image forming apparatus of claim 1, wherein the determiner determines that the switch has been detected in accordance with information indicating an end of monochrome printing.

5. The image forming apparatus of claim 1, wherein the determiner determines that the switch has been detected in accordance with information indicating a remaining page count in the monochrome print mode.

6. The image forming apparatus of claim 1, wherein when the image stabilization controller determines that the page count exceeds the second threshold without any of the predetermined conditions having been met, the image stabilization controller causes the image stabilization operation to be performed.

7. An image stabilization control method for an image forming apparatus, comprising the steps of:

counting a number of printed pages that have been printed since a last reset;

determining whether a next job is in a monochrome print mode or in a color print mode;

causing an image stabilization operation to be performed if a predetermined condition has been satisfied, the predetermined condition including any of (i) that an end of a current job is detected during a period that begins when the printed page count exceeds a first threshold and ends when the printed page count reaches a second threshold that is larger than the first threshold, and (ii) that it has been determined that a switch has been detected from the monochrome print mode to the color print mode during the period that begins when the printed page count exceeds the first threshold and ends when the printed page count reaches the second threshold; and resetting the printed page count after the image stabilization operation has been performed.

8. The image stabilization control method of claim 7, wherein the current job includes a plurality of print sets;

the predetermined condition further includes that a separation between sets is detected in the job during the period that begins when the printed page count exceeds the first threshold and ends when the printed page count reaches the second threshold, even if the end of the current job has not been detected.

9. The image stabilization control method of claim 8, wherein the predetermined condition further includes that the separation between sets is detected after the printed page count has reached a third threshold that is larger than the first threshold and smaller than the second threshold.

10. The image stabilization control method of claim 7, wherein the determiner determines that the switch has been detected in accordance with information indicating an end of monochrome printing.

11. The image stabilization control method of claim 7, wherein the determiner determines that the switch has been detected in accordance with information indicating a remaining page count in the monochrome print mode.

12. The image stabilization control method of claim 7, wherein when it has been determined that the page count exceeds the second threshold without any of the predetermined conditions having been met, causing the image stabilization operation to be performed.

* * * * *